DAVID DEVORE.

Improvement in Metallic Packing for Piston Rods, &c.

No. 122,578.

Patented Jan. 9, 1872.

Witnesses:
A. W. Almqvist
Francis McArdle

Inventor:
David Devore
Per [signature]
Attorneys.

UNITED STATES PATENT OFFICE.

DAVID DEVORE, OF PHILADELPHIA, PENNSYLVANIA, ASSIGNOR TO HIMSELF AND FREDERICK A. CHURCHMAN, OF WILMINGTON, DELAWARE.

IMPROVEMENT IN METALLIC PACKINGS FOR PISTON-RODS, &c.

Specification forming part of Letters Patent No. 122,578, dated January 9, 1872.

Specification describing certain Improvements in Metallic Packing for Piston-Rods, &c., invented by DAVID DEVORE, of Philadelphia, in the county of Philadelphia and State of Pennsylvania.

Figure 1:
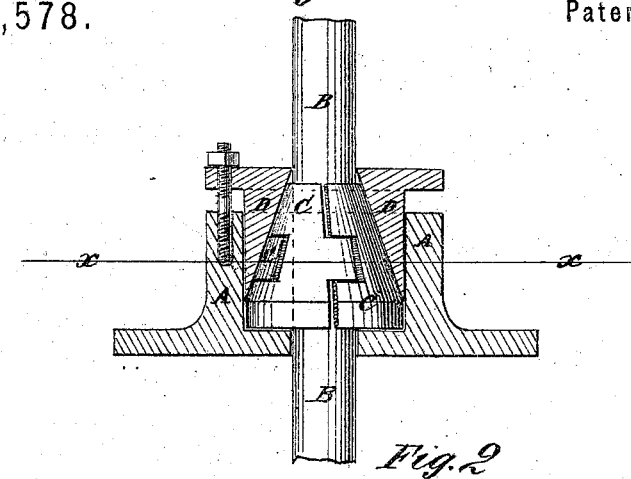
Figure 2:
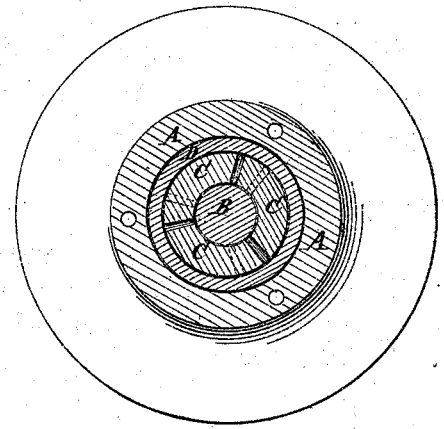
Figure 3:
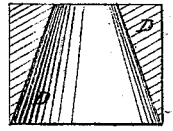

Figure 1 is a detail sectional view of my improved packing. Fig. 2 is a detail sectional view of the same taken through the line $x\ x$, Fig. 1. Fig. 3 is a detail sectional view of a modified form of the conical cap.

Similar letters of reference indicate corresponding parts.

My invention has for its object to furnish an improved metallic packing for piston-rods, valve-rods, pumps, &c., which shall be so constructed as to produce a secure and reliable packing, and one which will enable the wear to be conveniently taken up; and it consists in the construction and combination of the various parts of the packing, as hereinafter more fully described.

A represents the stuffing-box, and B is the rod that passes through it. C is the packing, which is made in two or more parts. The parts C of the packing are notched upon one of their side edges, and have tongues formed upon their other side edges to fit into the said notches, so that the said parts C may all interlock with each other, as shown in Figs. 1 and 2. The inner surface of the parts C are concaved to fit upon the rod B. The outer surface of the pieces C is made conical, as shown in Fig. 1, the lower edge being made of such a diameter as to fit into the stuffing-box A. D is a cap, the inner surface of which is made conical to fit upon the outer or conical surface of the packing C. The outer surface of this cap D is made cylindrical to fit into the cavity of the stuffing-box A. When the packing is to be applied to a new stuffing-box the cap D is made with a flange upon its outer end, as shown in Fig. 1. When applied to old stuffing-boxes the flange may be omitted, as shown in Fig. 3, the cap being secured in place by the ordinary means. By this construction, as the inner surface of the packing C wears the cap D is tightened up or forced inward so as to force the parts of the packing C closer together and closer to the rod B, thus taking up the wear and keeping the packing always tight and effective.

Having thus described my invention, I claim as new and desire to secure by Letters Patent—

The three-lip and tongue-jointed sections C C C, constructed and combined with pieces A D and shaft B, as and for the purpose described.

DAVID DEVORE.

Witnesses:
E. H. BAILEY,
W. HARRISON JAY. (151)